Figure 1:
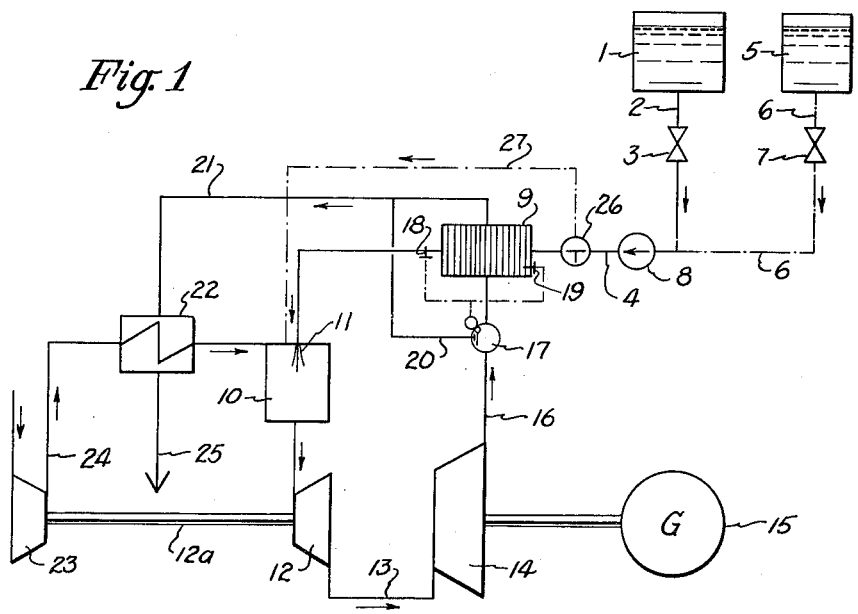

Feb. 2, 1965   E. MÜHLBERG ETAL   3,167,913
CONTINUOUS FLOW COMBUSTION CYCLE
Filed April 2, 1963

INVENTORS
Erhard Mühlberg
Siegfried Meurer

BY Bailey, Stephens & Huettig
ATTORNEYS

United States Patent Office 3,167,913
Patented Feb. 2, 1965

3,167,913
CONTINUOUS FLOW COMBUSTION CYCLE
Erhard Mühlberg and Siegfried Meurer, Nurnberg, Germany, assignors to Maschinenfabrik Augsburg-Nurnberg A.G., Nurnberg, Germany
Filed Apr. 2, 1963, Ser. No. 274,891
Claims priority, application Germany, July 12, 1958, M 38,254
9 Claims. (Cl. 60—39.02)

This application is a continuation-in-part of our copending application Serial No. 826,317, filed July 10, 1959, now abandoned, for "Continuous Flow Combustion Cycle."

This invention relates to a continuous flow combustion cycle such as applied in a power plant to a gas turbine providing for partial recovery of the waste heat by means of an endothermal reaction taking place between the fuel and water outside the actual combustion chamber.

An object of this invention is a gas turbine system employing this cycle where an endothermic reaction takes place between a hydro-carbon fuel and water outside the combustion chamber.

Another object of this invention is to produce a process wherein, in a power plant having a combustion engine, the obviously and/or latently available waste heat from the engine is used to cause a reaction between hydrocarbon fuel and water outside the combustion chamber so that an inferior hydrocarbon fuel which the engine could burn inefficiently, if at all, is converted into a high grade largely gaseous fuel of higher total heat content consisting substantially of hydrogen and carbon monoxide which the engine can burn efficiently and cleanly.

In general, the invention is based on the concept that, in order to achieve an indirect increase in the calorific value, as well as to widen the scope of the types of hydrocarbon fuels usable in continuous combustion systems, waste heat from the system being employed to convert gaseous or liquid hydrocarbons having widely differing boiling points and ignition qualities into carbon monoxide and hydrogen by using water, as is known in the art of making hydrogen. The term waste heat from the system means not only the obviously available engine heat losses, that is the sensible heat of the exhaust gases, but also the so-called latent engine waste heat. One of the characteristics of this invention is that the heat passing from the combustion gases to the walls of the combustion chamber is also used as latent engine waste heat. Although the heat transferred to the combustion chamber walls is partly passed on to the secondary air, necessary for cooling the combustion gases flowing to the turbine for the purpose of avoiding temperatures higher than permissible in the components, and is consequently brought into the cycle, this results on the whole in a thermo-dynamic loss because the loss which occurs due to the power required to compress the secondary air is greater than the gain due to the heat transferred to the secondary air from the walls of the combustion chamber. Due to the fact that in the cycle covered by this invention the heat gain in the secondary air mentioned is noticeably lower as a result of the fact that, compared to the combustion chamber wall in the conventional cycle, the temperature of the shell surrounding the actual combustion chamber for the above-mentioned endothermic reaction between the hydrocarbon fuel and the water is considerably lower and, as explained above, a higher thermo-dynamic efficiency is obtained in the cycle according to this invention. In other words, in the case of a gas turbine plant equipped with a power turbine, the wall heat actually represents a heat loss in the thermo-dynamic sense. Contrary to the sensible heat of the exhaust gases, this is not quite so apparent but more hidden. For this reason, it is designated as "latent engine waste heat." The endothermic reaction is defined by the equation:

$$1C_nH_m + nH_2O = nCO + \left(n+\frac{m}{2}\right)H_2 \quad \Delta I_B = +x [\text{kcal./g.mol}]$$

wherein $\Delta I_B$ is the enthalpy of the reaction and $x$ is the value of said enthalpy, i.e. the heat absorbed by the system to produce the endothermic reaction. The combustible gaseous mixture of carbon monoxide and hydrogen so produced is fed into the combustion chamber in the usual manner.

A comparison of the quantity of heat released in the normal oxygen combustion of 1 gram mol $C_nH_m$ with the heat quanttiy released in the normal combustion of $n$ gram mols CO and $$n+\frac{m}{2}$$

gram mols $H_2$ shows, according to Hess's law of constant heat sums, that the combustion of the CO and $H_2$ fuel mixture supplies a quantity of heat which is greater than the quantity of heat released by direct combustion of 1 gram mol $C_nH_m$ exactly by the enthalpy of the reaction $\Delta I_B$.

Under the most favorable circumstances, the heat absorbed in the reaction or the enthapy of the reaction as, for example, in the reaction of heptane with water, amounts to $\Delta I_B = 271$ [kcal./g. mol], as shown in the following calculation which is based on the heat of formation referred to 18° C. and 1 atmosphere. See J. D. 'Ans and E. Lax, Taschenbuch für Chemiker und Physiker, 2. Auflage, (Handbook for Chemists and Physicists, 2nd edition), Springer-Verlag 1949. The letter $d$ denotes water in the form of vapor.

$$(C_7H_{16})_{\text{liquid}} + 7(H_2O)_d = 7CO + 15H_2 \quad (1a)$$

$$\Delta I_B = +54.0 + 7 \times 57.84$$
$$-7 \times 26.84 + 0 = +271 \text{ [kcal./g. mol]}$$

1 kmol $C_7H_{16} + 7$ kmol $H_2O$
   $= 7$ kmol $CO + 15$ kmol $H_2 + 271 \times 10^3$ [kcal./kmol]

100 kg. $C_7H_{16} + 126$ kg. $H_2O = 196$ kg. CO
   $+30$ kg. $H_2 + 271 \times 10^3$ [kcal./kmol]

1 kg. $C_7H_{16} + 1.26$ kg. $H_2O = 1.96$ kg. CO
   $+0.3$ kg. $H_2 + 2710$ [kcal./kg.] $\quad (1b)$ In the ideal case, the heat required for this reaction is obtained completely from the waste heat of the system either by heating the reaction vessel with the exhaust gas and/or using the heat transferred through the wall of the combustion chamber as the obviously and/or latently available waste heat. In the calculation of the enthalpy of the entire reaction of this invention, there is no consumption of extra heat, as contrasted to a method of introducing both the fuel and water directly into the combustion chamber and obtaining the heat of reaction by withdrawing the heat from the fuel otherwise used to drive the engine.

The 7 g. mols CO and 15 g. mols $H_2$ formed in the reaction of 1 mol $C_7H_{16}$ with water according to Equation 1a burn with the oxygen of the air and produce heat as follows:

$$7 \text{ CO} + 3.5 \text{ O}_2 = 7 \text{ CO}_2$$
$$\Delta I_{B_2} = 7 \times 26.84 + 0 \quad -7 \times 94.45$$
$$= -473.27 \text{ [kcal./g.mol]}$$

and $$15 \text{ H}_2 + 7.5 \text{ O}_2 = 15 \text{ (H}_2\text{O)}_d$$
$$\Delta I_{B_3} = 0 + 0 \quad -15 \times 57.84$$
$$= -867.60 \text{ [kcal./g.mol]}$$

The enthalpy of the entire reaction is therefore in the case of "indirect" combustion:

$(\Sigma\Delta I_B)_{H_2O\text{-reaction}} = \Delta I_{B_2} + \Delta I_{B_3}$
$= -1340.87$ [kcal./g. mol $C_7H_{16}$]

With a molecular weight of the heptane of $$M = 100 \frac{\text{kg.}}{\text{kmol}}$$

this corresponds to a net calorific value of $(H_u)_{H_2O\text{-reaction}} = (\Sigma\Delta I_B)_{H_2O\text{-reaction}}$ [kcal./g. mol]
$\times 10^3$ [g. mol/kmol] $\times 1/M$ [kmol/kg.]
$=$ approximately 13410 [kcal./kg.]

In the normal or "direct" air-oxygen combustion of $C_7H_{16}$, on the other hand, the enthalpy of the entire reaction is as follows:

$(C_7H_{16})_{liquid} + 11\ O_2 = 7\ CO_2 + 8\ (H_2O)_d$
$\Delta I_B = 54.0 + 0 - 7 \times 94.45 - 8 \times 57.84$
$= -1069.87$ [kcal/g. mol]

whence $(\Sigma\Delta I_B)_{normal} = -1069.87$ [kcal/g. mol $C_7H_{16}$]

This implies a net calorific value of the n-heptane of $(H_u)_{normal} = -10\ (\Sigma\Delta I_B)_{normal}$
$=$ approximately 10700 [kcal/kg.]

In the example chosen, the result is therefore an increase in the calorific value by the reaction of the heptane with water, which takes place before the reaction proper and is brought about by the waste heat from the system, of $\Delta H_u = (H_u)_{H_2O\text{-reaction}} - (H_u)_{normal}$
$= 13410 - 10700 = 2710$ [kcal/kg.]

or, respectively, an improvement, expressed in percentages, of the net calorific value of $\Delta H_u(\%) = 2710 \times 100/10700 = 25.3$ [% of $(H_u)_{normal}$]

The extent to which it is possible, in practice, to achieve this ideal increase in calorific value depends upon the quantity of CO and $H_2$ produced in the water reaction of the hydro-carbon. The result will be the better the nearer the conditions under which reaction takes place are to the optimum regarding temperature, pressure, duration, presence of catalysts and water additions.

An important fact in the application of this invention is that, by using suitable catalysts, the reaction temperatures needed for the reaction of the hydro-carbon with water can be substantially lowered. To promote the reaction between hydro-carbon and water, the catalyst can, for example, be placed in the reaction vessel and may, for example, consist of platinum gauze, nickel or some other catalytically active metal or metal oxide. The catalyst can also be applied as a thin coating on a ceramic lining on the reaction vessel wall or as a solution in a wear-resistant porous material. In the latter case, the catalyst may be a metal salt solution in a porous ceramic material. Furthermore, the catalyst can be colloidally dissolved in the fuel or water or both.

Figure 2:
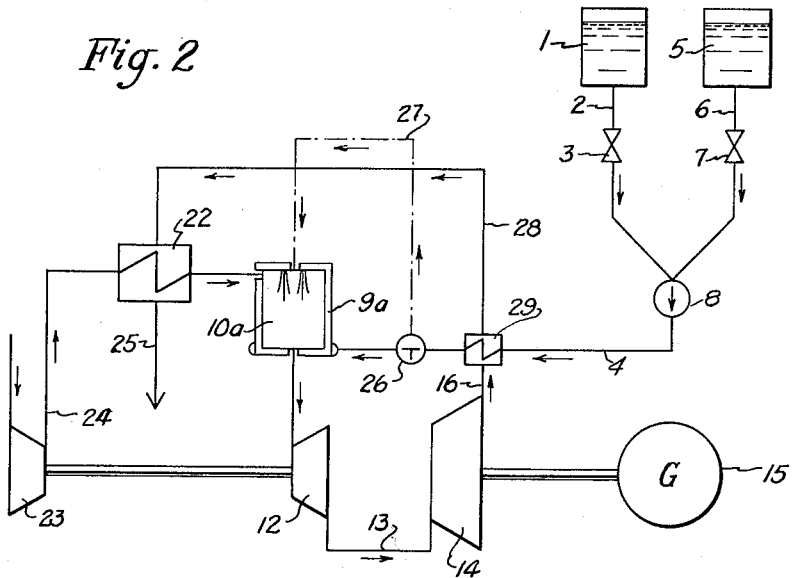

The means by which the objects of the invention are obtained are described more fully with reference to the accompanying diagrammatic drawings, in which:

FIGURE 1 is the heat-flow diagram for a gas turbine system according to this invention; and FIGURE 2 is a similar view of a modification of FIGURE 1.

As shown in FIGURE 1, in the power generating plant of this invention, the hydro-carbon fuel and the water are supplied in the form of a water emulsion or solution from supply tank 1 through pipe 2 and shut-off valve 3 into pump 8. Tank 5 is adapted to contain hydro-carbon fuel alone which, passing through pipe 6 and valve 7, can be supplied alone to pump 8 under special conditions, as in the starting of a combustion engine shown as a combustion chamber and a turbine. From pump 8, the mixture of hydrocarbon fuel and water passes through pipe 4 into reaction vessel 9 where the fuel and water are heated by exhaust gas and thus converted, depending on the equilibrium reaction conditions affected by pressure, temperature, mixing ratio, and type of catalysts, into carbon monoxide and hydrogen. The carbon monoxide and hydrogen mixture which contains more or less water and fuel vapors and, possibly, small amounts of by-products, passes into combustion chamber 10 through a burner 11, which being adjusted to the gaseous phase, fulfills the conditions for a complete combustion of the CO and $H_2$, together with oxygen obtained from the air, to form carbon dioxide and water vapor. The combustion gases then flow to compressor turbine 12 functioning as the high-pressure stage. From there, the gases flow through pipe 13 to the output turbine or prime mover 14 which is connected to the shaft of, say, a generator 15. Turbine 14 forms the low-pressure stage of the system. Exhaust gases from turbine 14 pass through exhaust pipe 16 through a temperature control device 17 and into reaction vessel 9. Waste heat from the power plant is therefore used to convert hydrocarbon fuel, including inferior fuels which could if at all be burned with difficulty in combustion chamber 10, into a high grade largely gaseous fuel with a higher total heat content which is burned cleanly and efficiently in chamber 10, and which consists substantially of hydrogen and carbon monoxide.

In the system of FIGURE 1, valve 17 is in the form of an exhaust gas control device in order to heat reaction vessel 9 either as determined by the heat sensitive element 18 placed in the combustible mixture outlet of vessel 9, or as measured by the heat sensitive element 19 placed in the reaction vessel wall for determining either the heat of the wall or the temperature within vessel 9.

Exhaust gas regulating valve 17 makes it also possible to shut off entirely the exhaust gas flow into vessel 9 so that all of the exhaust gas is by-passed through pipe 20 directly to the exhaust pipe 21 leading into the heat exchanger or regenerator 22. It is therefore possible to change from the carbon monoxide and hydrogen fuel to normal injection operation with a cold non-converted liquid fuel so that inspection and maintenance can be carried out on vessel 9 without the necessity of shutting down the turbine.

Exhaust gases coming from vessel 9 are led through pipe 21 to regenerator 22. The high-pressure stage turbine 12 is joined by a shaft 12a to air compressor 23 which passes supercharged air through pipe 24 into regenerator 22, wherein the supercharged air is preheated by the exhaust gases. The exhaust gases are then discharged into the atmosphere through pipe 25.

For starting the turbine or for conventional operation, a valve 26 is mounted in pipe 4 by means of which the fuel can by-pass vessel 9 through pipe 27 and be passed directly into combustion chamber 10, valve 3 being closed and valve 7 opened and valve 26 turned to cut off vessel 9 and communication with pipe 27 opened.

In the power generating plant of FIGURE 2, the parts similar to those in FIGURE 1 bear the same reference numerals. In this version, the reaction vessel 9a is formed as a jacket around combustion chamber 10a. The heat necessary for the endothermic reaction is thus that transferred through and taken from the wall of the combustion chamber. If the amount of heat obtained is insufficient, the deficit can be made up by means of a preheater 29 inserted in pipe 4 and heated by the exhaust gas coming from pipe 16 from turbine 14. From preheater 29, the exhaust gases are led through pipe 28 into regenerator 22.

A fuel and water emulsion or solution of suitable composition is forced by pump 8 under pressure through pipe 4 into preheater 29. The emulsion or solution is obtained for reaction in vessel 9a by simultaneously supplying to pump 8 water from tank 1 mixed with a suitable emulsifier or solvent and a liquid hydrocarbon fuel from tank 5. Pump 8 therefore both mixes and pumps the ingredients. The mixing ratio of fuel and water can be set by appropriate adjustment of the valves 3 and 7.

The heat taken from the exhaust gas by the emulsion or solution in the preheater 29, with a consequent temperature increase in the emulsion or solution, can be greater as the boiling point of the liquid is raised by the increase in pressure provided by pump 8 and without undesirable evaporation of the water or fuel taking place within preheater 29.

Upon leaving preheater 29, the emulsion or solution passes into the lower portion of vessel 9a which encloses combustion chamber 10a in which the reaction takes place between the hydrocarbon fuel and water. As in FIGURE 1, heat from the power plant is used to convert the fuel into a high grade largely gaseous fuel of higher total heat content which is then burned cleanly and efficiently in chamber 10a. In each case, the conversion of the fuel takes place outside of the combustion chamber. As heretofore, explained, the use of available waste heat in the case of a gas turbine plant, comprising a cycle according to FIGURE 2, is not as obvious as in the cycle according to FIGURE 1. It exists quasi more a latent heat recovery in the case of FIGURE 2, except the preheating of the fuel-water solution or emulsion by means of the preheater 29 which is heated by the exhaust gases, that is by an obvious part of the whole available waste heat.

By operating valves 3, 7 and 26, it is possible to cold start the engine and run it with the conventional injection of straight liquid fuel or a suitable fuel-water mixture directly into combustion chamber 10a. In this case, pipe 27 joined to valve 26 by-passes vessel 9a and leads the fuel directly into chamber 10a. In this case, because of preheater 29, which is heated by exhaust gases, the system can be operated, in a modified form, by the so-called "hot injection" method as employed in Otto cycle aircraft engines where the liquid fuels are heated to a high temperature before injection so that high boiling grades can be successfully burned. In addition to the advantage of some heat regeneration, as is known, this results in an improved efficiency of combustion because, due to the injection of the liquid fuel or fuel and water mixture heated under pressure to a high temperature, an instantaneous evaporation of the fuel jet occurs in the combustion chamber which promotes fuel mixture formation and because also the ignition lag insofar as it is determined by the chemical properties is reduced.

Where a long starting time is acceptable, as in the case of a stationary engine, it is also possible, in addition to conventional injections of hydrocarbon fuel alone by the turning of valves 3 and 7, to apply temporarily external heat to vessel 9, as, for example, by the use of bottled liquified or compressed gas or by industrial gas.

Advantages are obtained by the presence of water vapor derived from water that has not reacted with the hydrocarbon fuel or excess water deliberately allowed in the reaction because during combustion, and particularly when fuels having a tendency to form residues are involved, a water-gas reaction takes place in the combustion chamber according to the formula

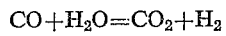

$$CO + H_2O = CO_2 + H_2$$

which assists combustion and restricts the formation of residues on surfaces contacted by the combustion gases. In this connection, the formation of the oxygen and hydrogen as a result of the decomposition of water vapor can also be favorable. Again, the inherent cleaning effect of water vapor tends to prevent deposit formation in the reaction vessel and on the catalysts. The additional water vapor in the combustion gases also helps to counteract the serious problem of deposits on the heating surfaces of regenerator 22 and on the stationary and moving blades of the turbine and the combustion chamber walls.

Finally, the cleaning effect of an increased water vapor concentration in the combustion gases is an advantage in keeping clean the walls of the reaction vessel and preheater which are in contact with the exhaust gases.

According to another feature of the invention, the water reaction of the hydrocarbon in the reaction vessel may be deliberately limited—without aiming at a maximum increase in the calorific value—by controlling the conditions under which the reaction takes place such as the ratio of fuel and water weights, pressure and temperature conditions in the reaction vessel, duration of reaction, in order to obtain a mixture of carbon monoxide and hydrogen which still contains an appreciable quantity of fuel vapor. This fuel vapor may, for instance, in the system exemplified in FIGURE 1, be converted into saturated vapor in passing from reaction vessel 9 to combustion chamber 10 in a manner that the gas fuel mixture, which may still contain some water vapor, is cooled by conventional means not shown down to a temperature below that at which the high boiling fractions (which normally have a better ignition quality) of the hydrocarbon fuel used will boil at the pressure existing in the combustion chamber. When the entire mixture is injected into the combustion chamber, fuel droplets of said high boiling fuel fractions, due to their great tendency to form peroxides, act as igniting agents to shorten the ignition lag while the major portion of the fuel burns in the gaseous state which improves the overall combustion efficiency.

Having now described the means by which the objects of the invention are obtained,

We claim:

1. A process for generating power in a power plant having a combustion engine including a combustion chamber wherein fuel is burned and the resulting hot products of combustion are used as the working fluid for the engine, such as a gas turbine, the improvement comprising mixing liquid hydrocarbon fuel with water in a proportion such that in the presence of heat substantially all of said liquid fuel and at least a part of the water will be converted to hydrogen and carbon monoxide, endothermically reacting said liquid fuel and water substantially entirely with heat available outside of and through the wall of said chamber to form a gaseous fuel composed of carbon monoxide and hydrogen having a higher heat content than said liquid fuel, burning said gaseous fuel in said combustion chamber to produce hot combustion gas which provides the heat for said endothermic reaction, and then passing the hot combustion gas into said engine for actuating said engine.

2. A process as in claim 1, in which said hydrogen and carbon monoxide are in the form of a gas at greater than atmospheric pressure.

3. A process as in claim 2, further comprising preheating at least a portion of said fuel and water before bringing it into heat exchange with said heat.

4. A process as in claim 3, further comprising preheating said fuel to a temperature below the evaporation temperature of said liquid fuel.

5. A process as in claim 4, further comprising regulating the quantity of heat taken from said chamber to produce the endothermic reaction between the liquid fuel and water.

6. A process as in claim 5, further comprising reacting said fuel and said water in the presence of a catalyst.

7. A process as in claim 6, further comprising limiting the extent of said fuel and water reaction to produce said gaseous fuel.

8. A process as in claim 7, further comprising introducing said gaseous fuel into said combustion chamber in the form of a wet vapor containing highly ignitable mist-like drops of fuel.

9. A process as in claim 8, further comprising mixing said fuel with a quantity of water greater than that required for said reaction to produce a mixture of combustible gases facilitating combustion and reducing residue formation.

References Cited by the Examiner

UNITED STATES PATENTS

| | | | |
|---|---|---|---|
| 1,840,690 | 1/32 | Bissell | 60—39.71 X |
| 2,655,786 | 10/53 | Carr. | |
| 2,660,032 | 11/53 | Rosenthal | 60—39.55 X |
| 2,735,265 | 2/56 | Eastman. | |

FOREIGN PATENTS 271,899   8/27   Great Britain.

SAMUEL LEVINE, *Primary Examiner.*